(12) United States Patent
Carney et al.

(10) Patent No.: US 9,211,602 B1
(45) Date of Patent: Dec. 15, 2015

(54) ELECTRODE HOLDER

(71) Applicants: Tom Carney, Ruston, LA (US); Wyatt Carney, Marshall, LA (US); Tim Coggins, Bernice, LA (US)

(72) Inventors: Tom Carney, Ruston, LA (US); Wyatt Carney, Marshall, LA (US); Tim Coggins, Bernice, LA (US)

( * ) Notice: Subject to any disclaimer, the term of this patent is extended or adjusted under 35 U.S.C. 154(b) by 278 days.

(21) Appl. No.: 13/705,729

(22) Filed: Dec. 5, 2012

Related U.S. Application Data (60) Provisional application No. 61/650,570, filed on May 23, 2012.

(51) Int. Cl.
*B23K 9/28* (2006.01)

(52) U.S. Cl.
CPC ........................................ *B23K 9/28* (2013.01)

(58) Field of Classification Search
CPC ........... B23K 9/28; B23K 9/282; B23K 9/287
USPC .................................................. 219/138–144
See application file for complete search history.

(56) References Cited

U.S. PATENT DOCUMENTS

| 2,310,020 | A | * | 2/1943 | Gallo | ............................ 219/141 |
|---|---|---|---|---|---|
| 2,371,649 | A | | 3/1945 | Radabaugh | |
| 2,468,873 | A | | 5/1949 | Harvey | |
| 2,538,245 | A | | 1/1951 | Hiller | |
| 2,810,807 | A | | 10/1957 | Luebbers, et al. | |
| 2,936,365 | A | | 5/1960 | Niemi | |
| 3,731,048 | A | * | 5/1973 | Ogden et al. | ............. 219/137.63 |
| 7,825,351 | B2 | | 11/2010 | Schneider | |
| 2006/0086709 | A1 | | 4/2006 | Schneider | |
| 2008/0128398 | A1 | * | 6/2008 | Schneider | ..................... 219/141 |

* cited by examiner

*Primary Examiner* — Brian Jennison
(74) *Attorney, Agent, or Firm* — R. Keith Harrison (57) ABSTRACT

An electrode holder includes an electrode holder handle having a handle interior, an electrically-conductive electrode clamp attachment head in the handle interior, an electrical insulator in the handle interior and engaging the electrode clamp attachment head, an electrically-conductive welding lead attachment head in the handle interior and engaging the electrical insulator, a switch contact slide space in the handle interior between the electrode clamp attachment head and the welding lead attachment head, an electrically-conductive switch contact slidably disposed in the switch contact slide space and a switch carried by the electrode holder handle and engaging the switch contact. The switch is positional between an OFF position wherein the switch contact is disposed out of electrical contact with at least one of the electrode clamp attachment head and the welding lead attachment head and an ON position wherein the switch contact is simultaneously disposed in electrical contact with the electrode clamp attachment head and the welding lead attachment head.

20 Claims, 7 Drawing Sheets

ELECTRODE HOLDER

CROSS-REFERENCE TO RELATED APPLICATIONS

This application claims the benefit of U.S. provisional application No. 61/650,570, filed May 23, 2012 and entitled ELECTRODE HOLDER, which provisional application is incorporated by reference herein in its entirety.

FIELD

Illustrative embodiments of the disclosure generally relate to welding apparatuses. More particularly, illustrative embodiments of the disclosure are directed to an electrode holder which can be operated to selectively turn a welding electrode on and off at times during normal operation when welding is not needed.

BACKGROUND

A conventional welding apparatus may include an electrode holder with a handle having an electrically-conductive interior portion which conducts electrical current and an electrically-insulated exterior portion on the electrically-conductive interior portion. A pair of spring-loaded clamp jaws may extend from the electrically-conductive interior portion of the handle, which may be connected via a long cord to a source of electrical current. The clamp jaws may be adapted to receive a welding electrode. Accordingly, in operation of the apparatus, the welding electrode is placed at the area where the materials which are to be welded are placed together. Electrical current flows through the handle, the welding electrode and the materials to be welded, melting the welding electrode and forming a weld between the materials.

One of the limitations of the conventional welding apparatus is that the controls for the electrical current may be located at a distance from the apparatus. Therefore, due to the inconvenience of terminating the electrical current at the apparatus, a welder may maintain a potential at the electrode holder at times during operation when use of the apparatus is not needed. This practice, however, creates a risk of shocks and burns to the welder, particularly in the event that the welder inserts a new welding electrode in the electrode holder without first terminating flow of electrical current to the electrode.

Accordingly, an electrode holder which can be operated to selectively turn a welding electrode on and off at times during normal operation when welding is not needed is desirable.

SUMMARY

Illustrative embodiments of the disclosure are generally directed to an electrode holder which can be operated to selectively turn a welding electrode on and off at times during normal operation when welding is not needed. An illustrative embodiment or the electrode holder includes an electrode holder handle having a handle interior, an electrically-conductive electrode clamp attachment head in the handle interior, an electrical insulator in the handle interior and engaging the electrode clamp attachment head, an electrically-conductive welding lead attachment head in the handle interior and engaging the electrical insulator, a switch contact slide space in the handle interior between the electrode clamp attachment head and the welding lead attachment head, an electrically-conductive switch contact slidably disposed in the switch contact slide space and a switch carried by the electrode holder handle and engaging the switch contact. The switch is positional between an OFF position wherein the switch contact is disposed out of electrical contact with at least one of the electrode clamp attachment head and the welding lead attachment head and an ON position wherein the switch contact is simultaneously disposed in electrical contact with the electrode clamp attachment head and the welding lead attachment head.

BRIEF DESCRIPTION OF THE DRAWINGS

Illustrative embodiments of the disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Referring initially to FIGS. 1-14 of the drawings, an illustrative embodiment of the electrode holder is generally indicated by reference numeral 1 in FIG. I. The electrode holder 1 includes an electrode handle 2. The electrode handle 2 has a handle wall 3 which may be generally elongated and cylindrical and has a front handle end 2a and a rear handle end 2b. The handle wall 3 of the electrode handle 2 may be plastic, ceramic and/or any other electrically-insulated material. As illustrated in FIGS. 1, 1A, 1B and 2, the electrode handle 2 has a handle interior 4.

The handle interior 4 may be open at the rear handle end 2b of the electrode holder handle 2. An annular handle shoulder 6 (FIG. 2) may be provided in the handle interior 4 in generally spaced-apart and adjacent relationship to the front handle end 2a. An electrode holder head cavity 12 may communicate with the handle interior 4 and extend beyond the handle shoulder 6 toward the front handle end 2a. An electrode clamp opening 18 may communicate with the electrode holder head cavity 12 and open at the front handle end 2a.

Figure 2:
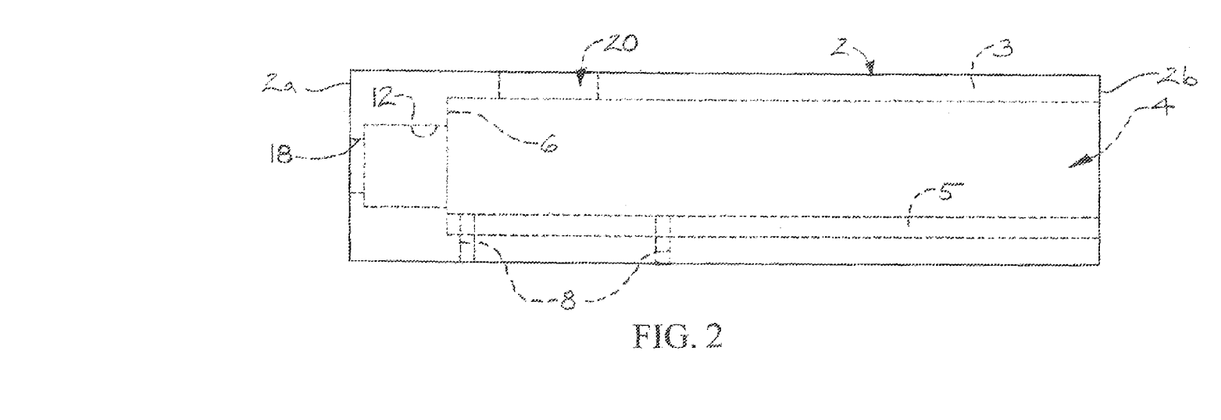
FIG. 2 is a side view of an exemplary electrode holder handle, with interior structural features of the handle illustrated in phantom.

As further illustrated in FIG. 2, in some embodiments, an elongated handle flange 5 may protrude from the interior surface of the handle wall 3 into the handle interior 4. The handle flange 5 may extend from the handle shoulder 6 to the rear handle end 2b of the electrode holder handle 2 and may be generally parallel to a longitudinal axis of the electrode holder handle 2. The purpose of the handle flange 5 will be hereinafter described. In some embodiments, a pair of spaced-apart set screw openings 8 may extend laterally through the handle wall 3 and the handle flange 5 and communicate with the handle interior 4 for purposes which will be hereinafter described.

Figure 3:
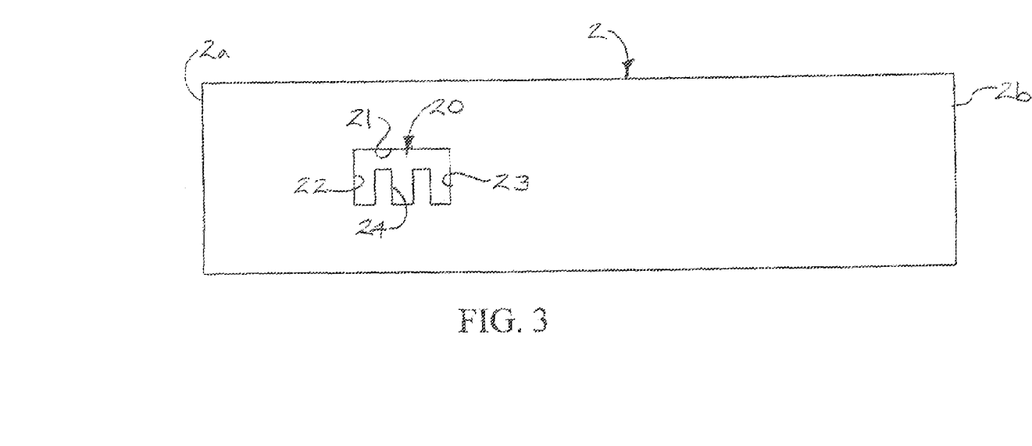
FIG. 3 is side view of the exemplary electrode handle, more particularly illustrating an exemplary configuration for a switch opening in the electrode handle.
Figure 4:
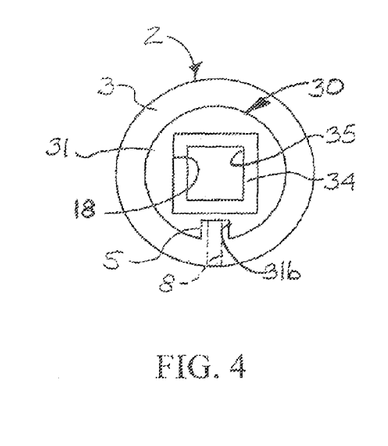
FIG. 4 is an end view of the exemplary electrode handle.

A switch opening 20 may extend through the handle wall 3 of the electrode handle holder 2. As illustrated in FIG. 3, in some embodiments, the switch opening 20 may include a generally elongated main slot 21. The main slot 21 of the switch opening 20 may be disposed in parallel relationship to a longitudinal axis of the electrode holder handle 2. A front slot 22 and a rear slot 23 may extend through the handle wall 3 and communicate with the front and rear ends, respectively, of the main slot 21. A middle slot 24 may extend through the handle wall 3 and communicate with the main slot 21 between the front slot 22 and the rear slot 23. The front slot 22, the rear slot 23 and the middle slot 24 of the switch opening 20 may be disposed in generally transverse relationship to the longitudinal axis of the electrode holder handle 2 and the main slot 21 and in generally parallel relationship to each other. Accordingly, the switch opening 20 may generally have the configuration of the capital letter "E".

Figure 1:
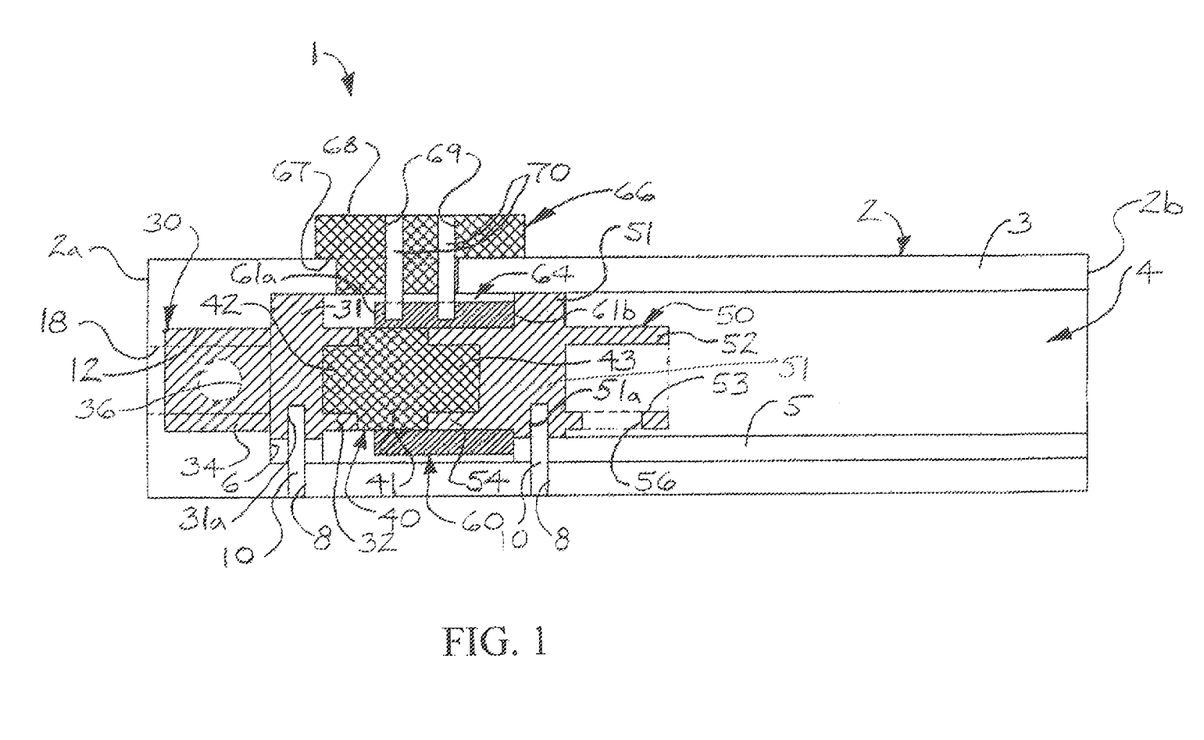
FIG. 1 is a longitudinal sectional view of an illustrative embodiment of the electrode holder and a switch of the electrode holder disposed in the OFF position.
Figure 11:
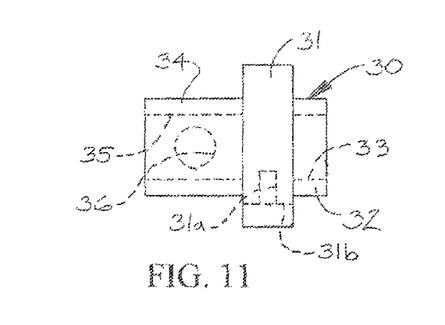
FIG. 11 is a side view of an exemplary electrode clamp attachment head.

As further illustrated in FIG. 1, an electrode clamp attachment head 30 is provided in the handle interior 4 of the electrode holder handle 2. The electrode clamp attachment head 30 may be a metal such as brass, bronze or copper, for example and without limitation, or may be any other electrically-conductive material. As illustrated in FIG. 11, the electrode clamp attachment head 30 may include an electrode clamp attachment head body 31 which may be generally cylindrical. A set screw cavity 31a (illustrated in phantom) may extend laterally into the electrode clamp attachment head body 31. A head groove 31b may also extend laterally into the outer edge of the electrode clamp attachment head body 31. The head groove 31b may communicate with the set screw cavity 31a.

Figure 12:
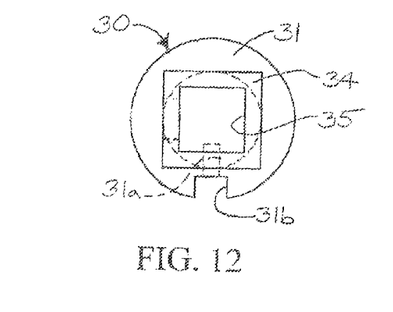
FIG. 12 is an end view of the exemplary electrode clamp attachment head.

A rear head extension 32 may extend from a rear surface of the electrode clamp attachment head body 31. The rear head extension 32 may have an insulator cavity 33. A front head extension 34 may extend from a front surface of the electrode clamp attachment head body 31. The front head extension 34 may have an electrode clamp cavity 35. In some embodiments, the front head extension 34 may have a circular cross-sectional shape. As illustrated in FIG. 12, in other embodiments, the front head extension 34 may have a square cross-sectional shape. An electrode clamp fastener opening 36 may extend laterally through the wall of the front head extension 34 and communicate with the electrode clamp cavity 35 for purposes which will be hereinafter described.

As illustrated in FIG. 1, the electrode clamp attachment head 30 is disposed in the handle interior 4 of the electrode holder handle 2 with the electrode clamp attachment head body 31 typically engaging the handle shoulder 6 and the front head extension 34 extending forwardly into the electrode holder head cavity 12 (FIG. 2). In assembly of the electrode holder 1, the electrode clamp attachment head 30 may be inserted into the handle interior 4 at the rear handle end 2b of the electrode holder handle 2 such that the outer circumferential surface of the electrode clamp attachment head body 31 engages the interior surface of the handle wall 3. Simultaneously, the head groove 31b (FIG. 12) in the outer edge of the electrode clamp attachment head body 31 may receive the handle flange 5 in the handle interior 4 such that the handle flange 5 stabilizes and prevents rotation of the electrode clamp attachment head 30 in the handle interior 4. In some embodiments, a set screw 10 may be extended through a set screw opening 8 in the handle wall 3 of the electrode holder handle 2 and threaded into the registering set screw cavity 31a in the electrode clamp attachment head body 31 to secure the electrode clamp attachment head 30 in the handle interior 4.

Figure 13:
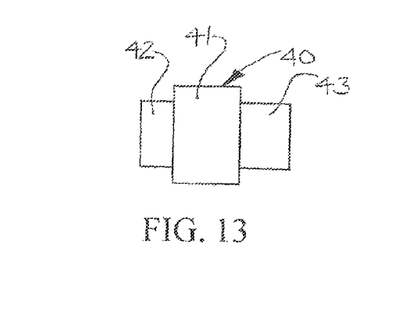
FIG. 13 is a side view of an exemplary electrical insulator.
Figure 14:
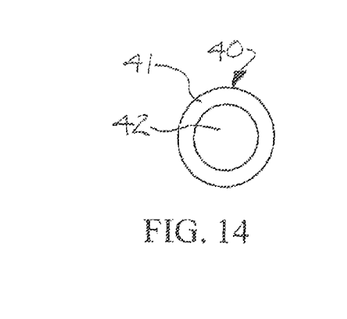
FIG. 14 is an end view of the exemplary electrical insulator.
Figure 15:
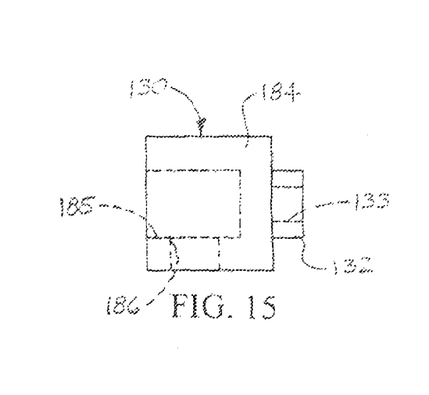
FIG. 15 is a side view of an exemplary electrode clamp attachment head according to an alternative illustrative embodiment of the electrode holder illustrated in FIG. 19, with interior structural features of the electrode clamp attachment head illustrated in phantom.
Figures 16, 17, 18:
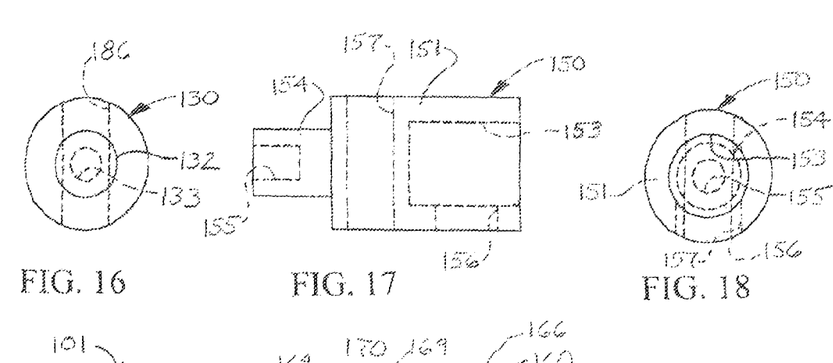
FIG. 16 is an end view of the exemplary electrode clamp attachment head illustrated in FIG. 15.
FIG. 17 is a side view of an exemplary welding lead attachment head according to the alternative illustrative embodiment of the electrode holder illustrated in FIG. 19.
FIG. 18 is an end view of the exemplary welding lead attachment head illustrated in FIG. 17.

An electrical insulator 40 is provided in the handle interior 4 adjacent and typically in engaging relationship to the electrode clamp attachment head 30. The electrical insulator 40 may be thermoset plastic, ceramic and/or any other suitable heat-resistant and electrically-insulating material. As illustrated in FIG. 13, the electrical insulator 40 may include an insulator body 41 which may be generally cylindrical. A front insulator extension 42 may extend from a front surface of the insulator body 41. A rear insulator extension 43 may extend from a rear surface of the insulator body 41. In assembly of the electrode holder 1, the electrical insulator 40 may be inserted in the handle interior 4 of the electrode holder handle 2 at the rear handle end 2b and pushed through the handle interior 4 until the front insulator extension 42 inserts into the insulator cavity 33 (FIG. 11) in the rear head extension 32 of the electrode clamp attachment head 30, as illustrated in FIGS. 15 and 16.

Figure 9:
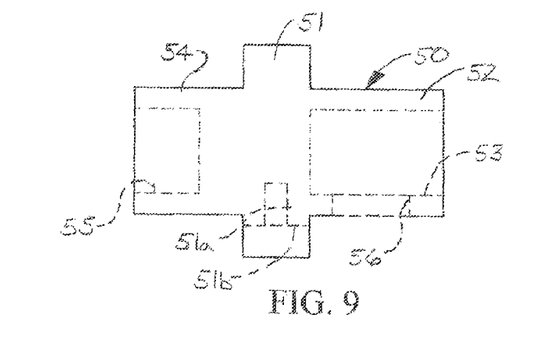
FIG. 9 is a side view of an exemplary welding lead attachment head.

As further illustrated in FIG. 1, a welding lead attachment head 50 is provided in the handle interior 4 of the electrode holder handle 2. The welding lead attachment head 50 may be an electrically-conductive metal or other material. In some embodiments the welding lead attachment head 50 may be copper, brass or bronze, for example and without limitation. As illustrated in FIG. 9, the welding lead attachment head 50 may include a welding lead attachment head body 51 which may be generally cylindrical. A set screw cavity 51*a* (illustrated in phantom) may extend laterally into the welding lead attachment head body 51. A head groove 51*b* may extend laterally into the outer edge of the welding lead attachment head body 51. The head groove 51*b* may communicate with the set screw cavity 51*a*.

A front head extension 54 may extend from a front surface of the welding lead attachment head body 51. The front head extension 54 may have an insulator cavity 55. A rear head extension 52 may extend from a rear surface of the welding lead attachment head body 51. The rear head extension 52 may have a welding lead cavity 53. A welding lead fastener opening 56 may extend laterally through the wall of the rear head extension 52 and communicate with the welding lead cavity 53 for purposes which will be hereinafter described.

Figure 1A:
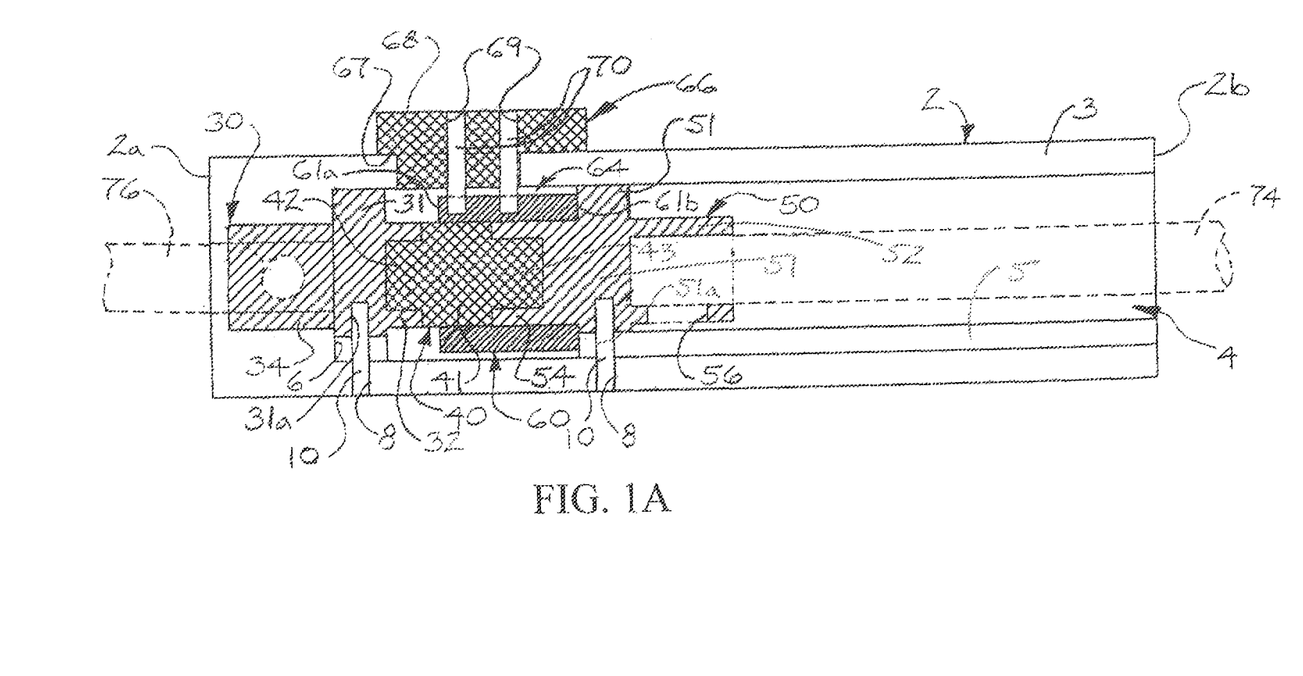
FIG. 1A is a longitudinal sectional view of the illustrative electrode holder, with a welding lead (illustrated in phantom) and an electrode clamp (illustrated in phantom) attached to the electrode holder in exemplary application and a switch of the electrode holder disposed in the OFF position.
Figure 1B:
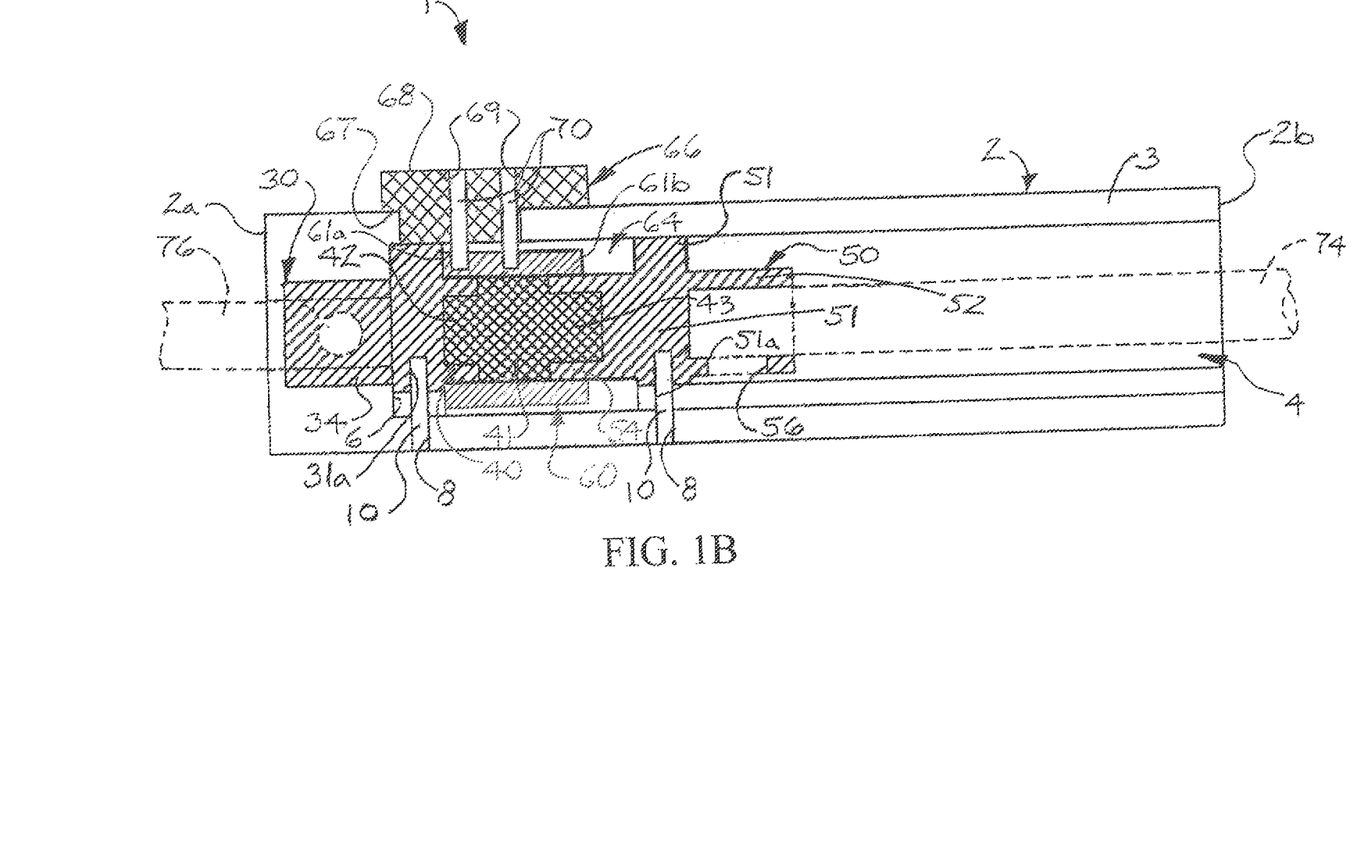
FIG. 1B is a longitudinal sectional view of the illustrative electrode holder, with the switch of the electrode holder disposed in the ON position.
Figure 10:
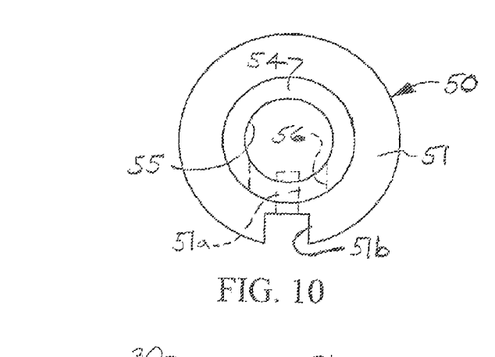
FIG. 10 is an end view of the exemplary welding lead attachment head.

As illustrated in FIG. 1, the welding lead attachment head 50 is disposed in the handle interior 4 of the electrode holder handle 2 with the welding lead attachment head body 51 engaging the interior surface of the handle wall 3 and the insulator cavity 55 (FIG. 9) in the front head extension 54 accommodating the rear insulator extension 43 of the electrical insulator 40. In assembly of the electrode holder 1, the welding lead attachment head 50 may be inserted into the handle interior 4 at the rear handle end 2*b* of the electrode holder handle 2 such that the outer circumferential surface of the welding lead attachment head body 51 engages the interior surface of the handle wall 3. Simultaneously, the head groove 51*b* (FIG. 10) in the outer edge of the welding lead attachment head body 51 may receive the handle flange 5 in the handle interior 4 such that the handle flange 5 stabilizes the welding lead attachment head 50 in the handle interior 4. In some embodiments, a set screw 10 may be extended through a set screw opening 8 in the handle wall 3 of the electrode holder handle 2 and threaded into the registering set screw cavity 51*a* in the electrode clamp attachment head body 51 to secure the electrode clamp attachment head 50 in the handle interior 4. The electrical insulator 40 electrically isolates the electrode clamp attachment head 30 from the welding lead attachment head 50. As illustrated in FIGS. 1 1A and 1B, an annular switch contact slide space 64 may be defined by and between the electrode clamp attachment head body 31 and the rear head extension 32 of the electrode clamp attachment head 30, the insulator body 41 of the electrical insulator 40 and the front head extension 54 and welding lead attachment head body 51 of the welding lead attachment head 50.

Figure 5:
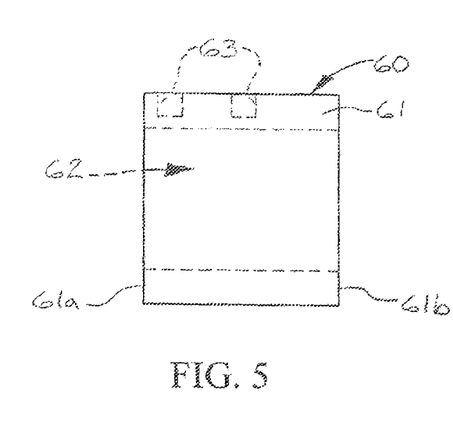
FIG. 5 is a side view of an exemplary switch contact with interior structural features illustrated in phantom.
Figure 6:
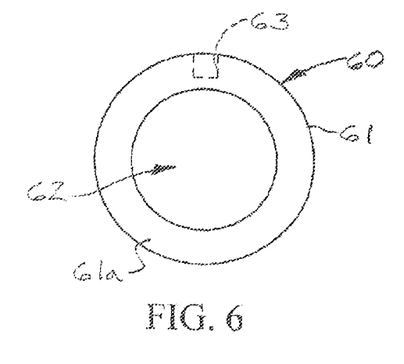
FIG. 6 is an end view of the exemplary switch contact.

A switch contact 60 is provided in the switch contact slide space 64 in the handle interior 4 of the electrode holder handle 2. The switch contact 60 may be an electrically-conductive metal and/or other material. In some embodiments, the switch contact 60 may be copper, brass or bronze, for example and without limitation. As illustrated in FIGS. 5 and 6, the switch contact 60 may have a generally cylindrical switch contact wall 61 with a front contact end 61*a* and a rear contact end 61*b*. A switch contact opening 62 may extend through the switch contact 60 from the front contact end 61*a* to the rear contact end 61*b*. In some embodiments, a pair of screw cavities 63 may extend laterally into the switch contact wall 61 for purposes which will be hereinafter described. The switch contact 60 is positional between "OFF" and "ON" positions in the switch contact slide space 64. When the switch contact 60 is disposed in the "OFF" position of the electrode holder 1, as illustrated in FIGS. 1 and 1A, the switch contact opening 62 (FIG. 5) of the switch contact 60 normally accommodates the insulator body 41 of the electrical insulator 40 and the front head extension 54 of the welding lead attachment head 50. When the switch contact 60 is disposed in the "ON" position of the electrode holder 1 (FIG. 1B), the switch contact opening 62 may accommodate the rear head extension 32 of the electrode clamp attachment head 30, the insulator body 41 of the electrical insulator 40 and the front head extension 54 of the welding lead attachment head 50.

As further illustrated in FIGS. 1 and 1A, when it is in the "OFF" position in the switch contact slide space 64 to de-energize the electrode holder 1, as will be hereinafter further described, the switch contact 60 is disposed in electrical contact with the front head extension 54 of the welding lead attachment head 50 and remains out of electrical contact with the rear head extension 32 of the electrode clamp attachment head 30. When it is in the "ON" position in the switch contact slide space 64 to energize the electrode holder 1, as illustrated in FIG. 1B, the switch contact 60 is simultaneously disposed in electrical contact with both the front head extension 54 of the welding lead attachment head 50 and the rear head extension 32 of the electrode clamp attachment head 30. Accordingly, in the "ON" position, the switch contact 60 establishes a pathway for flow of electrical current from the welding lead attachment head 50 to the electrode clamp attachment head 30 for purposes which will be hereinafter described.

Figure 7:
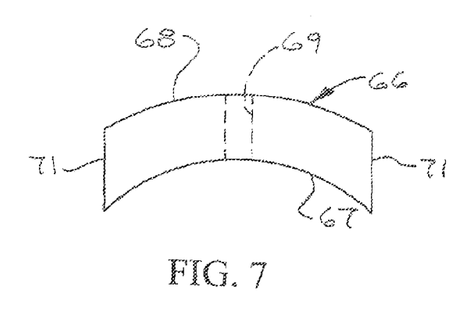
FIG. 7 is an end view of an exemplary switch.
Figure 8:
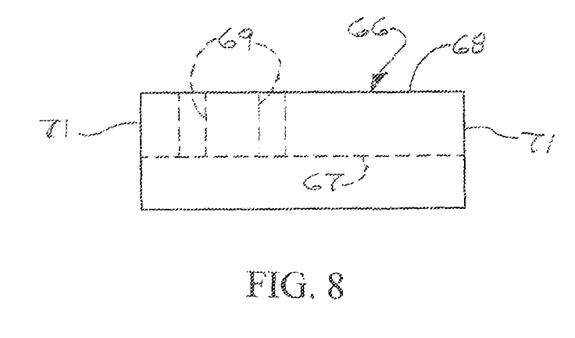
FIG. 8 is a side view of the exemplary switch.

A switch 66 is provided on the exterior of the electrode holder handle 2. The switch 66 mechanically engages the switch contact 60 and is operable to selectively move the switch contact 60 between the "OFF" position (FIGS. 1 and 1A) and the "ON" position (FIG. 1B) in the switch contact slide space 64 in the electrode holder handle 2. As illustrated in FIGS. 7 and 8, the switch 66 may have a concave switch surface 67 which engages the complementary convex exterior surface of the handle wall 3; a convex switch surface 68 which is generally spaced-apart and parallel to the concave switch surface 67; and side switch surfaces 71 which extend between the concave switch surface 67 and the convex switch surface 68. A pair of spaced-apart switch screw opening 69 may extend through the switch 66 from the convex switch surface 68 to the concave switch surface 67.

The switch 66 may be attached to the switch contact 60 according to any suitable technique which is known by those skilled in the art. As illustrated in FIGS. 1, 1A and some embodiments, a pair of switch screws 70 may extend through the respective switch screw openings 69 in the switch 66 and through the switch opening 20 (FIGS. 2 and 3) in the handle wall 3, respectively. The switch screws 70 may be threaded into the respective registering screw openings 63 (FIG. 5) in the switch contact wall 61 of the switch contact 60. When the switch contact 60 is in the "OFF" position (FIGS. 1 and 1A), the switch screws 70 may be positioned in the rear slot 23 (FIG. 3) and the middle slot 24, respectively, of the switch opening 20 to lock or retain the switch 66 in the "OFF" position. When the switch contact 60 is in the "ON" position (FIG. 1B), the switch screws 70 may be positioned in the middle slot 24 and the front slot 22, respectively, of the switch opening 20 to lock or retain the switch 66 in the "on" position. The switch 66 can be selectively moved from the "OFF" position to the "ON" position by shifting the switch 66 in a first sideways direction (to the right in the embodiment illustrated in the drawings) on the electrode holder handle 2 to reposition the switch screws 70 from the rear slot 23 and the middle slot 24 into the main slot 21, sliding the switch 66 forwardly in the main slot 21 and then shifting the switch 66 in a second sideways direction (to the left in the embodiment illustrated in the drawings) to reposition the switch screws 70 from the main slot 21 into the middle slot 24 and the front slot 22, respectively. The switch 66 can be selectively moved from the "ON" position to the "OFF" position by reversing the above steps.

In exemplary application, the electrode holder 1 facilitates selective flow of electrical current from a welding lead 74 (FIGS. 1A and 1B) to a welding electrode clamp 76, and termination of the flow of electrical current at the electrode holder 1, as desired, in welding of two pieces of metal (not illustrated) to each other. Accordingly, the welding lead 74 is connected to an electrical current source (not illustrated) which may be located at a distance from the location at which the electrode holder 1 will be used. The electrical current source which is used to supply electrical current to the electrode holder 1 may be any type of conventional source of electrical current which can be used for welding applications. A welding lead fastener (not illustrated) may be extended through the welding lead fastener opening 56 in the rear head extension 52 of the welding lead attachment head 50 and through a registering fastener opening (not illustrated) in the welding lead 74 to secure the welding lead 74 to the welding lead attachment head 50.

The electrode clamp 76 may be inserted into the electrode clamp cavity 35 (FIG. 11) in the front head extension 34 of the electrode clamp attachment head 30. An electrode clamp fastener (not illustrated) may be extended through the electrode clamp fastener opening 36 in the front head extension 34 of the electrode clamp attachment head 30 and through a registering fastener opening (not illustrated) in the electrode clamp 76 to secure the electrode clamp 76 to the electrode clamp attachment head 30. The electrode clamp 76 may have a conventional design with a pair of spring-loaded jaws (not illustrated) which are adapted to securely grip a welding electrode (not illustrated) typically in the conventional manner.

In some embodiments of the electrode holder 1, the electrode clamp cavity 35 in the front head extension 34 of the electrode clamp attachment head 30 may have a circular cross-section to receive a corresponding circular-shaped attachment on the electrode clamp 76 (FIGS. 1A and 1B). In other embodiments, the electrode clamp cavity 35 in the front head extension 34 may have a square cross-section to receive a corresponding square-shaped attachment on the electrode clamp 76. Therefore, the square-shaped electrode clamp cavity 35 may facilitate positioning of the electrode clamp 76 at a selected one of multiple possible orientations with respect to the electrode holder handle 2 according to the preferences or depending on the handedness of a welder (not illustrated) who uses the electrode holder 1.

In operation of the electrode holder 1, electrical current flows from the electrical current source (not illustrated), through the welding lead 74 to the welding lead attachment head 50. The switch 66 is normally in the "OFF" position, as illustrated in FIGS. 1 and 1A, such that the switch contact 60 simultaneously contacts the front head extension 54 of the welding lead attachment head 50 and the electrical insulator 40 and does not contact the electrode clamp attachment head 30. Therefore, the electrical insulator 40 blocks flow of electrical current from the welding lead attachment head 50 to the electrode clamp attachment head 30.

A welder (not illustrated) grips the electrode holder handle 2 with the left or right hand. The welding electrode (not illustrated) which is attached to the electrode clamp 76 is placed at an area where two materials are to be welded together, typically in the conventional manner. The welder can use his or her thumb to manipulate the switch 66 from the "OFF" position (FIGS. 1 and 1A) to the "ON" position (FIG. 1B) in the switch opening 20 (FIG. 3) typically by sliding the switch 66 to the right, forwardly and to the left, respectively. This action repositions the switch screws 70 from the rear slot 23 (FIG. 3) and the middle slot 24, respectively, forwardly through the main slot 21 and then into the middle slot 24 and the front slot 22, respectively, of the switch opening 20, retaining the switch 66 in the "ON" position. Therefore, the switch contact 60 slides forwardly in the switch contact slide space 64 such that the switch contact 60 simultaneously contacts both the front head extension 54 of the welding lead attachment head 50 and the rear head extension 32 of the electrode clamp attachment head 30. Accordingly, electrical current flows from the welding lead attachment head 50 through the switch contact 60 to the electrode clamp attachment head 30 and then through the electrode clamp 76 and the welding electrode (not illustrated) which is attached to the electrode clamp 76. The electrical current melts the welding electrode, forming a weld between the materials. The design of the electrode holder 1 prevents arcing of the electrical current in the work area when the welding apparatus is running.

Under some circumstances, such as during movement of the electrode holder 1 from one location or weld point to another, for example, it may be desirable to temporarily terminate flow of electrical current to the electrode clamp 76. Therefore, the electrode holder 1 can be selectively turned off to terminate further flow of electrical current from the welding lead 74 to the electrode clamp 76 by manipulating the switch 66 from the "ON" position to the "OFF" position in the switch opening 20 typically by sliding the switch 66 to the right, rearwardly and to the left, respectively. This action repositions the switch screws 70 from the middle slot 24 (FIG. 3) and the front slot 22, respectively, rearwardly through the main slot 21 and then into the rear slot 23 and the middle slot 24, respectively, of the switch opening 20, retaining the switch 66 in the "OFF" position. Therefore, the switch contact 60 slides rearwardly in the switch contact slide space 64 and electrical contact between the switch contact 60 and the electrode clamp attachment head 30 is broken. The electrode holder 1 can again be energized by manipulation of the switch 66 back to the "on" position as was heretofore described.

Referring again to FIGS. 1, 1A and 1B of the drawings, the electrode clamp attachment head 30, the electrical insulator 40, the welding lead attachment head 50 and/or the switch contact 60 can be selectively removed from the handle interior 4 of the electrode holder handle 2 for replacement or repair. This may be accomplished by removing the set screws 10 from the respective set screw openings 8 and the set screw cavity 31a in the electrode clamp attachment head 30 and the set screw cavity 51a in the welding lead attachment head 50, respectively, and the switch screws 70 from the switch screw openings 69 and the respective screw openings 63 (FIG. 5) in the switch contact 60. The welding lead attachment head 50, the electrical insulator 40, the electrode clamp attachment head 30 and the switch contact 60 can be removed from the handle interior 4 at the rear handle end 2b for replacement or repair, as deemed necessary.

It will be appreciated by those skilled in the art that the electrode holder 1 enables a welder to selectively terminate flow of current to a welding electrode at times during normal operation when welding is not needed. Moreover, the design of the switch 66 enables the switch 66 to be selectively locked in the "ON" position or the "OFF" position, as was noted above. The design of the switch 66 imparts ergonomics, comfort and operational versatility to the welder whether the welder uses the left hand or the right hand to operate the electrode holder 1. Moreover, the various components of the electrode holder 1 can be easily removed from the electrode holder handle 2 for replacement or repair, as was noted above. The electrode holder 1 is also amenable to metal cutting applications.

Referring next to FIGS. 15-19 of the drawings, an alternative illustrative embodiment of the electrode holder is generally indicated by reference numeral 101. Elements of the electrode holder 101 which are analogous to the corresponding elements of the electrode holder 1 heretofore described with respect to FIG. 1-14 are designated by the same reference numerals in the 101-199 series. As illustrated in FIGS. 15 and 16, the electrode clamp attachment head 130 of the electrode holder 101 includes an electrode clamp attachment head body 184 which may be cylindrical. An electrode clamp cavity 185 extends into a front surface of the electrode clamp attachment head body 184. An electrode clamp fastener opening 186 may extend laterally into the electrode clamp attachment head body 184 and communicate with the electrode clamp cavity 185. A rear head extension 132 having an insulator cavity 133 extends from a rear surface of the electrode clamp attachment head body 184.

As illustrated in FIGS. 17 and 18, the welding lead attachment head 150 of the electrode holder 101 includes a welding lead attachment head body 151 which may be cylindrical. A welding lead cavity 153 extends into a rear surface of the welding lead attachment head body 151. A welding lead fastener opening 156 may extend laterally into the welding lead attachment head body 151 and communicates with the welding lead cavity 153. A front head extension 154 having an insulator cavity 155 extends from a front surface of the welding lead attachment head body 151. A set screw opening 157 may extend transversely through the welding lead attachment head body 151 between the welding lead cavity 153 and the front head extension 154.

Figure 19:
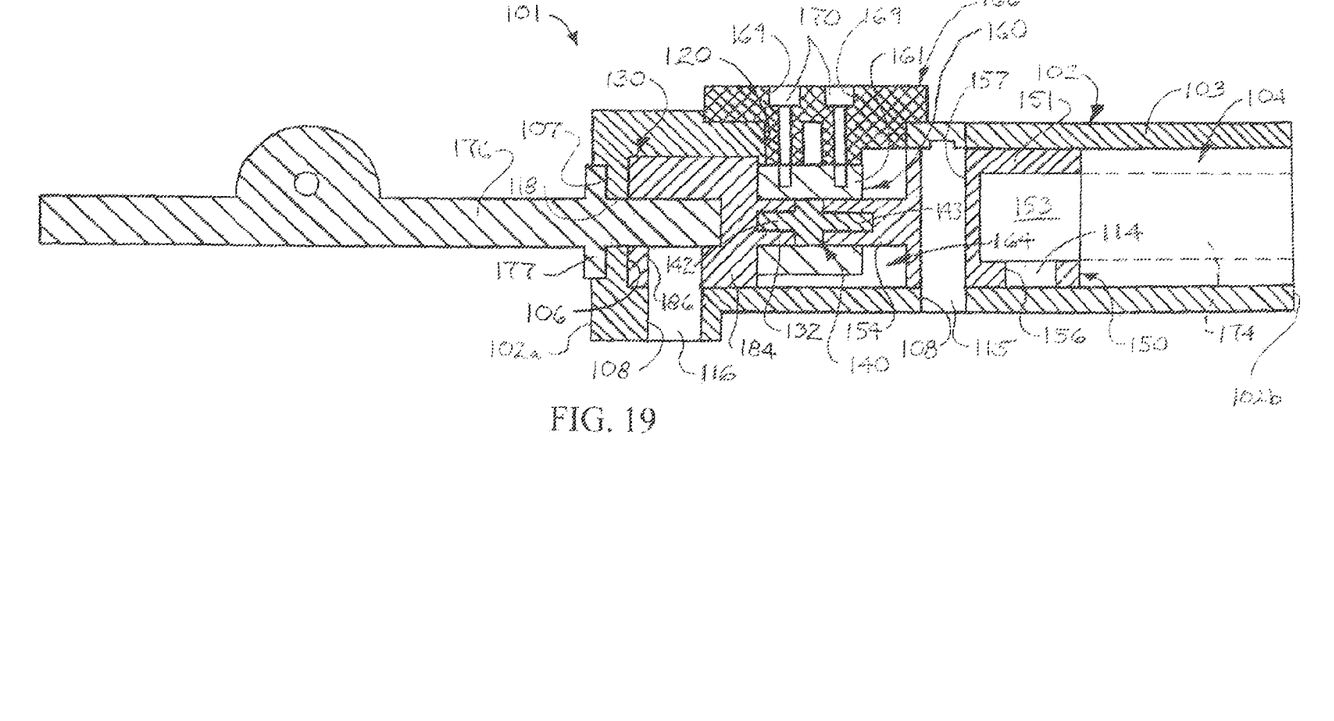
FIG. 19 is a longitudinal sectional view of an alternative illustrative embodiment of the electrode holder.

As illustrated in FIG. 19, the electrode clamp attachment head 130, the electrical insulator 140 and the welding lead attachment head 150 are disposed inside the handle interior 104 of the electrode holder handle 102. The front end of the electrode clamp attachment head 130 may engage the handle shoulder 106 in the handle interior 104. The insulator cavity 133 in the rear head extension 132 of the electrode clamp attachment head 130 accommodates the front insulator extension 142 of the electrical insulator 140. Similarly, the insulator cavity 155 in the front lead extension 154 of the welding lead attachment head 150 accommodates the rear insulator extension 142 of the electrical insulator 140. The switch contact 160 is slidably disposed in a switch contact space 164 in the handle interior 154. A switch 166 is slidably mounted in a switch opening 120 in the handle wall 103 of the electrode holder handle 102 and operably engages the switch contact 160 such as in a manner which was heretofore described with respect to FIGS. 1-14. In the ON position of the switch 166, as illustrated in FIG. 19, the switch contact 160 establishes electrical contact between the rear head extension 132 of the electrode clamp attachment head 130 and the front head extension 154 of the welding lead attachment head 150. In the OFF position of the switch 166, the switch contact 160 is disposed in electrical contact with the front head extension 154 and out of electrical contact with the rear head extension 132 of the electrode clamp attachment head 130 as was heretofore described with respect to the electrode holder 1 in FIG. 1B.

Exemplary application of the electrode holder 101 may be as was heretofore described with respect to the electrode holder 1 in FIGS. 1, 1A and 1B. Accordingly, an electrode clamp 176 may be inserted through the electrode clamp opening 118 in the front handle end 102a of the electrode holder handle 102 and into the registering electrode clamp cavity 185 of the electrode clamp attachment head 130. An electrode clamp fastener 116 may be threaded through a fastener opening 108 in the electrode holder handle 102 and tightened against the electrode clamp 176 to secure the electrode clamp 176 in the electrode clamp cavity 185. In some embodiments, the electrode clamp 176 may be fitted with an electrode clamp flange 177. The electrode clamp flange 177 may be seated in a correspondingly-shaped clamp flange seat 107 in the front handle end 102a of the electrode holder handle 102 to stabilize the electrode clamp 176 on the electrode holder handle 102.

An attachment head fastener 115 may be extended through a fastener opening 108 in the handle wall 103 of the electrode holder handle 102 and threaded through the registering set screw opening 157 in the welding lead attachment head 150 to secure the welding lead attachment head 150 in the handle interior 104 of the electrode holder handle 102. A welding lead 174 is inserted, into the handle interior 104 at the rear handle end 102b and into the registering welding lead cavity 153 of the welding lead attachment head 150, respectively. A welding lead fastener 114 may be threaded through the welding lead fastener opening 156 in the welding lead attachment head body 151 of the welding lead attachment head 150 and tightened against the welding lead 174 to secure the welding lead 174 in the welding lead cavity 153. Operation of the electrode holder 101 may be as was heretofore described with respect to operation of the electrode holder 1 in FIGS. 1, 1A and 1B.

While illustrative embodiments of the disclosure have been described above, it will be recognized and understood that various modifications can be made and the appended claims are intended to cover all such modifications which may fall within the spirit and scope of the disclosure.

What is claimed is:

1. An electrode holder, comprising:
an electrode holder handle having a handle interior;
an electrically-conductive electrode clamp attachment head in the handle interior, the electrode clamp attachment head configured to receive and secure an electrode clamp for a welding electrode;
an electrically-conductive welding lead attachment head in the handle interior and engaging the electrical insulator in spaced-apart relationship to the electrode clamp attachment head;
an electrode insulator in the handle interior between the electrode clamp attachment head and the welding lead attachment head;
a switch contact slide space in the handle interior between the electrode clamp attachment head and the welding lead attachment head, the switch contact slide space spanning at least a portion of the electrode clamp attachment head, the electrical insulator and at least a portion of the welding lead attachment head;
an electrically-conductive switch contact slidably disposed in the switch contact slide space; and
a switch carried by the electrode holder handle and engaging the switch contact, the switch positional between an OFF position wherein the switch contact is disposed out of electrical contact with at least one of the electrode clamp attachment head and the welding lead attachment head and an ON position wherein the switch contact is simultaneously disposed in electrical contact with the electrode clamp attachment head and the welding lead attachment head.

2. The electrode holder of claim 1 further comprising a handle flange in the handle interior and a head groove provided in each of the electrode clamp attachment head and the welding lead attachment head and accommodating the handle flange.

3. The electrode holder of claim 1 wherein the electrode clamp attachment head comprises an electrode clamp attachment head body and a rear head extension extending from the electrode clamp attachment head body.

4. The electrode holder of claim 3 further comprising an insulator cavity in the rear head extension of the electrode clamp attachment head, the insulator cavity accommodating the electrical insulator.

5. The electrode holder of claim 1 wherein the welding lead attachment head comprises a welding lead attachment head body and a front head extension extending from the welding lead attachment head body.

6. The electrode holder of claim 5 further comprising an insulator cavity in the front head extension of the welding lead attachment head, the insulator cavity accommodating the electrical insulator.

7. The electrode holder of claim 1 wherein the electrical insulator comprises an insulator body and a front insulator extension and a rear insulator extension extending from the insulator body.

8. The electrode holder of claim 7 wherein the electrode clamp attachment head comprises an electrode clamp attachment head body and a rear head extension extending from the electrode clamp attachment head body and having a first insulator cavity accommodating the front insulator extension of the electrical insulator and the welding lead attachment head comprises a welding lead attachment head body and a front head extension extending from the welding lead attachment head body and having a second insulator cavity accommodating the rear insulator extension of the electrical insulator.

9. An electrode holder, comprising:
an electrode holder handle having a handle interior;
an electrically-conductive electrode clamp attachment head in the handle interior, the electrode clamp attachment head configured to receive and secure an electrode clamp for a welding electrode;
an electrically-conductive welding lead attachment head in the handle interior and engaging the electrical insulator in spaced-apart relationship to the electrode clamp attachment head;
an electrode insulator in the handle interior between the electrode clamp attachment head and the welding lead attachment head;
a switch contact slide space in the handle interior between the electrode clamp attachment head and the welding lead attachment head, the switch contact slide space spanning at least a portion of the electrode clamp attachment head, the electrical insulator and at least a portion of the welding lead attachment head;
an electrically-conductive switch contact slidably disposed in the switch contact slide space;
a switch opening having a generally elongated main slot, a front slot and a rear slot perpendicular to and communicating with the main slot and a middle slot perpendicular to and communicating with the main slot between the front slot and the rear slot;
a pair of switch screws engaging the switch contact and extending through the switch opening; and
a switch carried by the electrode holder handle and engaging the switch contact, the switch positional between an OFF position wherein the switch contact is disposed out of electrical contact with at least one of the electrode clamp attachment head and the welding lead attachment head and an ON position wherein the switch contact is simultaneously disposed in electrical contact with the electrode clamp attachment head and the welding lead attachment head.

10. The electrode holder of claim 9 further comprising a handle flange in the handle interior and a head groove provided in each of the electrode clamp attachment head and the welding lead attachment head and receiving the handle flange.

11. The electrode holder of claim 9 wherein the electrode clamp attachment head comprises an electrode clamp attachment head body and a rear head extension extending from the electrode clamp attachment head body.

12. The electrode holder of claim 11 further comprising an insulator cavity in the rear head extension of the electrode clamp attachment head, the insulator cavity accommodating the electrical insulator.

13. The electrode holder of claim 9 wherein the welding lead attachment head comprises a welding lead attachment head body and a front head extension extending from the welding lead attachment head body.

14. The electrode holder of claim 13 further comprising an insulator cavity in the front head extension of the welding lead attachment head, the insulator cavity accommodating the electrical insulator.

15. The electrode holder of claim 9 wherein the electrical insulator comprises an insulator body and a front insulator extension and a rear insulator extension extending from the insulator body.

16. The electrode holder of claim 15 wherein the electrode clamp attachment head comprises an electrode clamp attachment head body and a rear head extension extending from the electrode clamp attachment head body and having a first insulator cavity accommodating the front insulator extension of the electrical insulator and the welding lead attachment head comprises a welding lead attachment head body and a front head extension extending from the welding lead attachment head body and having a second insulator cavity accommodating the rear insulator extension of the electrical insulator.

17. An electrode holder for selectively establishing flow of electrical current from a welding lead to an electrode clamp, comprising:
an electrode holder handle having a handle interior;
an electrically-conductive electrode clamp attachment head in the handle interior, the electrode clamp attachment head configured to receive and secure an electrode clamp for a welding electrode and including:
an electrode clamp attachment head body;
an electrode clamp cavity in the electrode clamp attachment head body, the electrode clamp cavity adapted to accommodate the electrode clamp;
a rear head extension extending from the electrode clamp attachment head body, the rear head extension having an insulator cavity;
an electrically-conductive welding lead attachment head in the handle interior and engaging the electrical insulator in spaced-apart relationship to the electrode clamp attachment head, the welding lead attachment head including:
a welding lead attachment head body;
welding lead cavity in the welding lead attachment head body, the welding lead cavity adapted to receive the welding lead; and
a front head extension extending from the welding lead attachment head body, the front head extension having an insulator cavity accommodating the rear insulator extension of the electrical insulator;

an electrical insulator in the handle interior between the electrode clamp attachment head and the welding lead attachment head, the electrical insulator including:

an insulator body;

a front insulator extension extending from the insulator body and inserted in the insulator cavity in the rear head extension of the electrode clamp attachment head; and a rear insulator extension extending from the insulator body;

a switch contact slide space in the handle interior between the electrode clamp attachment head and the welding lead attachment head, the switch contact slide space spanning the rear head extension of the electrode clamp attachment head, the electrical insulator and the front head extension of the welding lead attachment head;

an electrically-conductive switch contact slidably disposed in the switch contact slide space; and a switch carried by the electrode holder handle and engaging the switch contact, the switch positional between an OFF position wherein the switch contact is disposed out of electrical contact with at least one of the electrode clamp attachment head and the welding lead attachment head and an ON position wherein the switch contact is simultaneously disposed in electrical contact with the electrode clamp attachment head and the welding lead attachment head.

18. The electrode holder of claim 17 further comprising a switch opening in the electrode holder handle and a pair of switch screws engaging the switch contact and the switch and extending through the switch opening.

19. The electrode holder of claim 18 wherein the switch opening comprises a generally elongated main slot, a front slot and a rear slot perpendicular to and communicating with the main slot and a middle slot perpendicular to and communicating with the main slot between the front slot and the rear slot.

20. The electrode holder of claim 19 wherein the switch screws are adapted to engage the rear slot and the middle slot of the switch opening in the OFF position of the switch and the switch screws are adapted to engage the middle slot and the front slot of the switch opening in the ON position of the switch.

* * * * *